March 14, 1967   H. B. MILLER   3,309,654
ACOUSTIC APPARATUS
Filed Sept. 2, 1965   2 Sheets-Sheet 1

INVENTOR.
HARRY B. MILLER
BY Samuel R. Genca
ATTORNEY

United States Patent Office

3,309,654
Patented Mar. 14, 1967

3,309,654
ACOUSTIC APPARATUS
Harry B. Miller, Rochester, N.Y., assignor to General
Dynamics Corporation, a corporation of Delaware
Filed Sept. 2, 1965, Ser. No. 484,543
8 Claims. (Cl. 340—10)

The present invention relates generally to broadband acoustic apparatus and more particularly to an electromechanical transducer.

Although the present invention is suited for more general applications, it is particularly adapted for use in transducers. A problem of long standing in the transducer art is that of obtaining a relatively broad bandwidth for transmitting acoustic energy under water. This is particularly true for underwater communication and detection.

In the past, many attempts have been made to increase the frequency bandwidth of resonant transducers. A freely suspended simple rod (i.e., long and thin) of piezoelectric or magneto-strictive material, when electrically excited into longitudinal vibration, will resonate according to the laws of a rod mechanically clamped at the center. This means that only the odd harmonics will be produced, namely: first, third, fifth, etc. The even harmonics will be suppressed, namely: second fourth, sixth, etc. Hence, in general, the bandwidth of the rod or transducer is restricted to a relatively narrow region around the fundamental longitudinal resonant frequency $f_r$.

When the initially simple rod is modified with a lumped mass at one end (head mass) and a lumped mass of the other end (tail mass) the simple harmonic progression one, three, five, is modified slightly. The third harmonic tends to become lowered by a few percent; the fifth harmonic becomes lowered by a slightly greater percentage; etc.

It is virtually impossible to obtain, by electrically exciting the rod into longitudinal vibration, a frequency at or near the longitudinal second harmonic, namely $2f_r$. One alternative is to encourage a bending mode in the composite element, which will provide a bending resonance at or near $2f_r$. A problem arises, however, because it is very simple to excite uncontrolled or "spurious" modes other than the one, three, five longitudinal harmonic progression, by utilizing bending modes.

In accordance with the invention, as will be shown hereinafter, a controlled bending mode may be made to occur in the region of $2f_r$, thereby increasing the effective bandwidth of the excited rod or transducer.

Accordingly, it is a general object of the present invention to provide an improved electromechanical transducer.

It is another object of the present invention to provide an improved electromechanical transducer having a wider frequency bandwidth than prior art transducers.

It is yet another object of the present invention to provide an improved transducer which radiates or receives acoustic energy by means of longitudinal expansion and contraction of a signal-responsive member, and also includes at least one other mode of vibration in addition to the simple longitudinal expansion mode, such as a controlled bending or flexural mode.

It is still another object of the present invention to provide an improved electromechanical transducer which includes a longitudinal mode and a bending mode of vibration that produces a compound motion at the radiating face, which compound motion, however, is primarily piston-like in manner over the operating bandwidth of the transducer. By "piston-like manner" is meant simple reciprocating motion.

It is another object of the present invention to provide an improved electromechanical transducer which is relatively inexpensive, rugged, and compact.

It is a still further object of the present invention to provide an improved transducer in which the electrically untuned bandwidth is larger than is the case in prior transducers.

Briefly described, an improved electromechanical transducer embodying the invention includes a back member having a first mass and which is heavy and therefore relatively stationary, and a radiating piston having a second mass and which is lighter than the first mass, and is moveable relative to the back member. Further included is a column of electromechanically active material which can vibrate longitudinally along a longitudinal axis along the column in response to either an applied electrical signal or an applied mechanical signal. The column may be, for example, a half-cylindrical stack which includes a plurality of half-ring piezoelectric members, polarized in either the 3—3 direction (electrical field parallel to mechanical displacement) or the 3–1 direction (electrical field perpendicular to mechanical displacement) so as to vibrate in a longitudinal direction when excited by the electrical signal. The transducer may be symmetrical abont a first plane through a longitudinal axis along the column and may be unsymmetrical about a second plane through this longitudinal axis and normal to the first plane, so that the column and piston may, when excited, vibrate in a longitudinal mode and a flexural mode simultaneously.

The transducer includes a first mechanical mesh which compirses the radiating piston and the column and has operating characteristics similar to a narrow-band filter.

A motional impedance curve, i.e., a curve which describes the motional impedance of the piston and column versus frequency, shows that the motional impedance below, through, and above resonance resembles the deep-valley responses of a band-elimination filter. The motional impedance is at a minimum at resonance. Above or below resonance, the motional impedance curve increases along a steep-sloped curve and approaches infinity as the frequency increases or decreases on each side of the resonant frequency.

In accordance with the invention, the asymmetrical column and piston define a second mechanical mesh which functions in a bending or flexural mode of vibration and is closely coupled to the first mechanical mesh. The resonance of the second mesh is at or near twice the resonance of the first mesh, i.e., the first mesh resonance is $f_r$ and the second mesh resonance is at about $2f_r$. At this flexural resonance $2f_r$, the motional impedance also decreases for the second mesh as just described for the first mesh. Thus, as the frequency of the transducer increases beyond the resonance $f_r$ of the first mesh, the motional impedance is again decreased by the resonance $2f_r$ of the second mechanical mesh to level off the increasing motional impedance and maintain a constant magnitude over a wide band of frequencies, thereby increasing the bandwidth of the transducer.

The invention itself, both as to its organization and method of operation, as well as additional objects and advantages thereof, will become more readily apparent from a reading of the following description in connection with the accompanying drawings in which.

Figure 1:
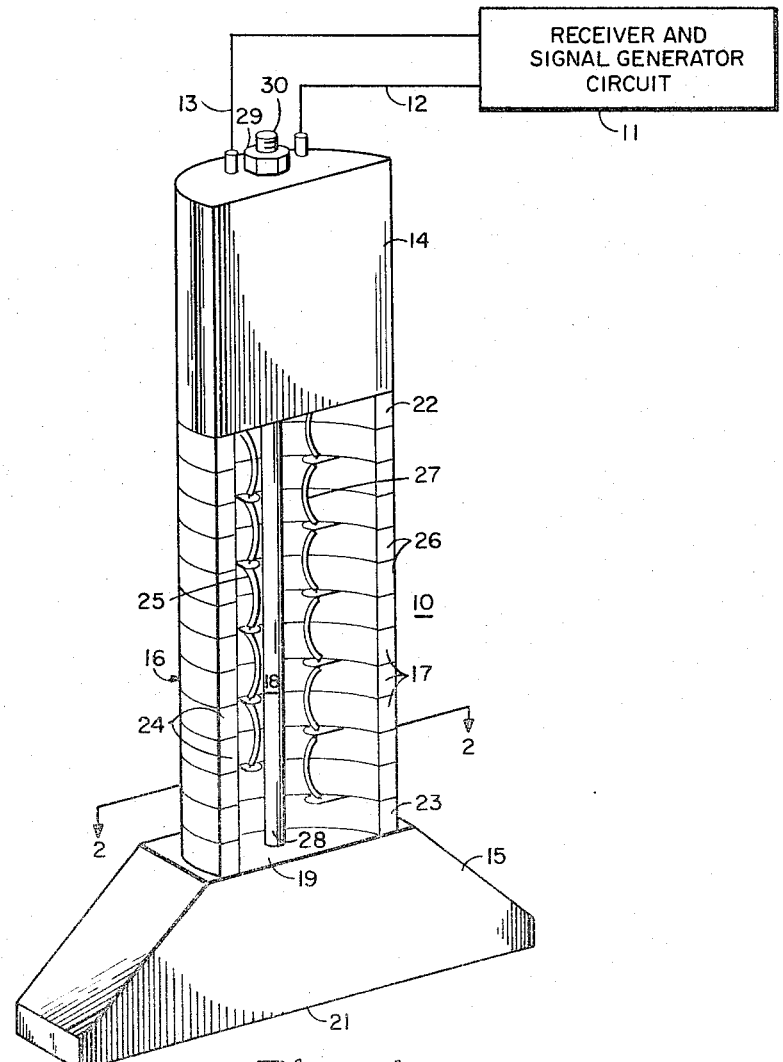
FIG. 1 is a perspective view of an electromechanical transducer in accordance with the invention.
Figure 2:
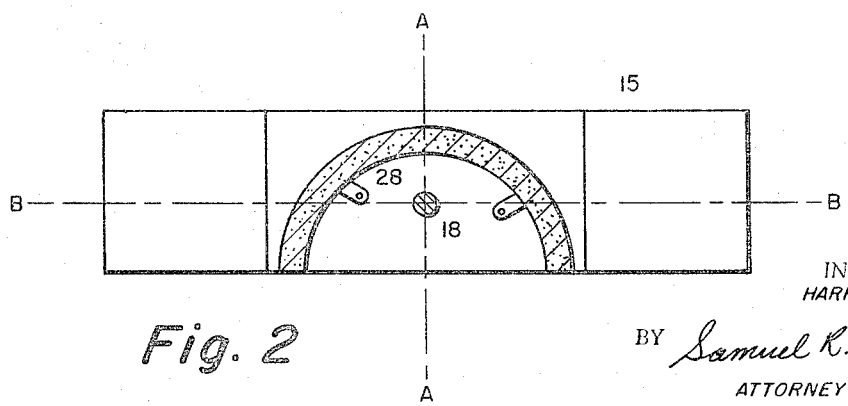
FIG. 2 is a cross sectional view of the transducer illustrated in FIG. 1, taken along line 2—2 looking in the direction of the arrows.

Referring to FIGS. 1 and 2, an electromechanical transducer 10 is shown coupled to a receiver and signal generator circuit 11 by way of leads 12 and 13. The electromechanical transducer 10 comprises a back member 14, a radiating piston 15, and a column 16 which may be made up of a stack of half-ring piezoelectric members 17 interposed between the back member 14 and the radiating piston 15. The electromechanical transducer 10 further includes a biasing means 18 coupled to the back member 14 and the radiating piston 15 for resiliently biasing or compressing the column of half-ring piezoelectric members 17.

The back member 14 has a mass which may be considered as presenting a lumped mass reactance. The weight of the back member 14 is heavier than the weight of the radiating piston 15 so as to be relatively stationary with respect to the radiating piston 15. The radiating piston 15 moves relative to the back member 14 when it is vibrated so that acoustic energy may be received or transferred to a load (not shown) such as seawater coupled to the transducer. It should be pointed out that a water-tight casing or housing (not shown) is provided for the transducer 10 and that only the essential structure believed necessary to describe the invention is shown in FIGS. 1 and 2.

The radiating piston 15 has one face 19 proximal to the column 16 of the half-ring piezoelectric members 17 and another face 21 on the other side of the radiating piston 15. The face 21 is larger than the face 19, so as to match the impedance of the transducer 10 to the load (viz., the seawater). The radiating piston 15 is illustrated as being a trapezoid in cross section; however, other shapes may be utilized which are substantially rigid, but may have a flexural or bending mode of vibration, which is approximately two times the natural or resonant frequency $f_r$ of the transducer 10.

The column 16 includes a plurality of half-ring piezoelectric members 17 made of ceramic material such as barium titanate, lead zirconate titanate, or the like. The half-ring piezoelectric members 17 are polarized such that eletcrodes placed, for example, on opposite faces of each of the half-ring members and energized by an electric field, will cause the members 17 to expand and to contract in the thickness mode which is the longitudinal mode of the column. That is, the column 16 of half-ring members 17 will expand and contract longitudinally when a suitable electric field is applied across the various half-ring piezoelectric members 17. Insulating half-rings 22 and 23 are disposed on each end of the column 16 for insulating the half-ring members 17 from the back member 14 and the radiating piston 15. The electrodes 24 which are disposed on one face of each of the half-ring piezoelectric members are connected in common to the receiver and signal generator circuit 11 by way of a conductor 25 connected to the lead 13. In a similar manner, common electrodes 26 are provided on each of the other faces of the half-ring piezoelectric members 17. The electrodes 26 are connected in common by a conductor 27, which is also connected to the lead 12 and to the receiver and signal generator circuit 11. The half-ring piezoelectric members 17 are electrically connected in common to expand simultaneously in response to a signal of one polarity and to contract in response to an electric signal of an opposite polarity, so as to vibrate longitudinally. Although piezoelectric members 17 in FIGS. 1 and 2 are shown, it should be understood that other signal responsive members, such as magnetostrictive members may be used.

The biasing means 18 may be of the type which is disposed within the circle of the half-ring piezoelectric member 17 and connected to the radiating piston 15 at a point slightly off center along a line A—A across the face 19 of the radiating piston 15, as shown in FIG. 2. This line A—A is also in a first plane along a diametral longitudinal axis of the column 16.

Referring to FIG. 2, the transducer 10 is symmetrical about the line A—A and also about the first plane. The line A—A may also extend through the center of the biasing means 18 and is perpendicular to a line B—B through the center of the biasing means 18 and normal to line A—A. The line B—B lies in the second plane which is perpendicular to the first plane. The biasing means 18 includes a resilient rod 28, which functions as a "soft" compression spring, which is capable of delivering a high D.C. or static compressional force. The rod 28 also has a relatively low stiffness, so as to not unduly impede the dynamic (A.C.) expansion and contraction of the piezoelectric members 17. The rod 28 may be threaded into the driven radiating piston 15 and secured to the back member 14 by a nut 29, which engages a threaded portion 30 of the rod 28. The biasing means 18 is preferably used in the illustrated embodiment. It should be understood, however, that the relationship of the first and second planes with respect to the column 16 should be maintained. The column 16 is unsymmetrical with respect to the second plane.

The radiating piston 15, the piezoelectric members 17 and back member 14 may be coupled together without the biasing means 18; for example, they may be cemented together by a suitable adhesive, such as an epoxy cement, to thereby eliminate the biasing means 18. The piston 15 is symmetrical with respect to both the first and second planes. Thus, the column and piston vibrate, when excited, in a longitudinal mode and a flexural mode simultaneously. In other words, the center of gravity of the column 16 and of the piston 15 are offset from each other along the first plane wherein A—A lies.

The transducer 10 includes a two-mesh mechanical circuit, one mesh having a natural or resonant frequency which is in a ratio to the other of approximately two-to-one. That is, one of the two mechanical meshes may have a resonant frequency $f_r$ while the other mechanical mesh may have a resonant frequency of about $2f_r$. Thus, in effect, the transducer 10 has a first resonant frequency at $f_r$ and a second resonant frequency at about $2f_r$ which increases the bandwidth of the transducer 10, as will be shown hereinafter. The two mechanical meshes are characterized by (a) a longitudinal mode of vibration which may have a resonant frequency at $f_r$ and by (b) a flexural mode of vibration which may have a resonant frequency at about $2f_r$. In the embodiment shown in FIG. 1, the column 16 of half-ring piezoelectric members 17 and the radiating piston 15 vibrate in a longitudinal mode at the resonant frequency $f_r$ and define the first mechanical mesh. The column 17 and the radiating piston 15 also vibrate in the flexural mode at a resonant frequency of about $2f_r$ and define the second mechanical mesh.

Figure 3:
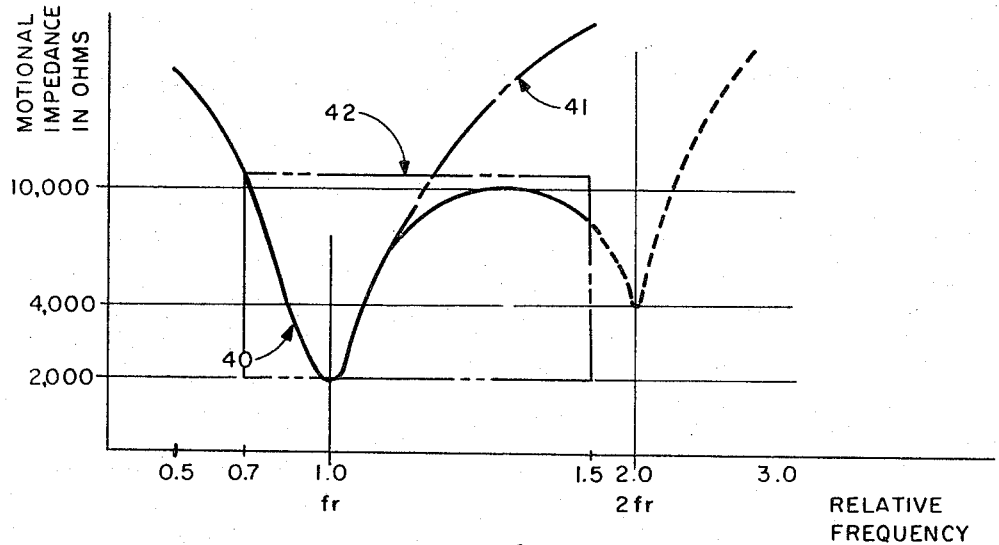
FIG. 3 is an operating curve of the transducer shown in FIG. 1 and illustrates how the motional impedance of the transducer varies with respect to frequency.

The two mesh mechanical circuit operates to increase the bandwidth of the transducer by lowering the motional impedance of the transducer in the frequency region of $2f_r$. Referring to FIG. 3, the curve 40 illustrates the variation of motional impedance with frequency. As the frequency increases from a frequency less than the resonant frequency $f_r$ of the first mechanical mesh, the motional impedance decreases until it reaches a minimum at the resonant frequency $f_r$ of the resonant system of the first mesh. As the frequency increases beyond the resonant frequency $f_r$, the motional impedance also increases. In the absence of the second mechanical mesh, the motional impedance would increase and approach infinity as shown by the line 41 made up of long dashes. In accordance with the invention, the motional impedance is lowered in the region of $2f_r$ by the second mechanical mesh which is also a resonant system. Thus, by the combination of the two mechanical meshes, the motional impedance is confined within the box 42 shown in FIG. 3 and can thus match the impedance of an amplifier in the receiver and generator 11.

Figure 4:
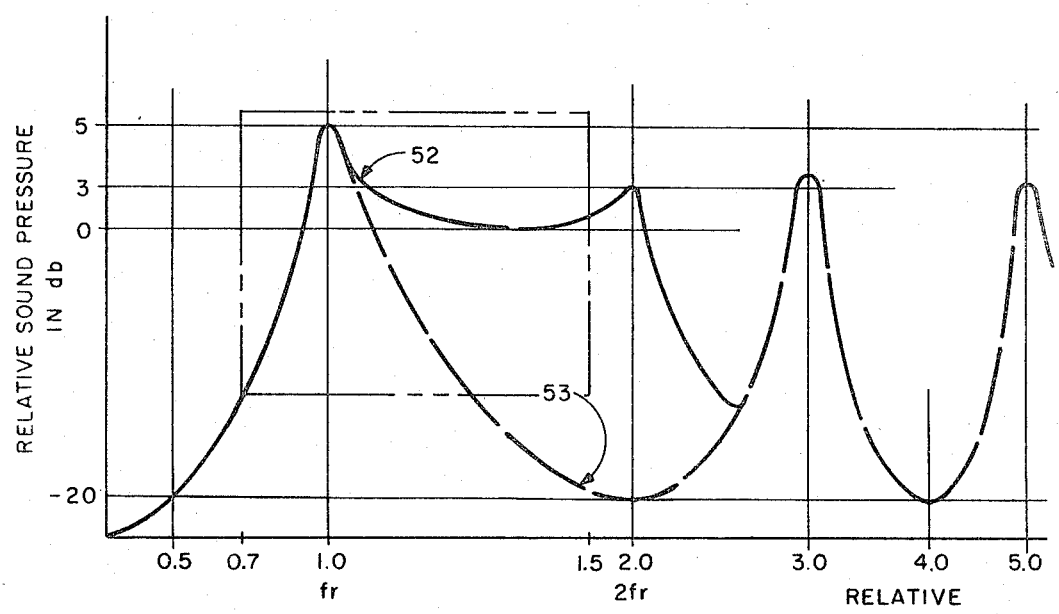
FIG. 4 is another curve showing how the bandwidth of the transducer of FIG. 1 is increased according to the invention.

In FIG. 4, the relative sound pressure of the transducer 10 is plotted against frequency to show the correlation between the motional impedance and the acoustic response at the first and second resonances $f_r$ and $2f_r$ of the transducer 10 as shown by the solid line 52. The transducer 10 has, in the absence of the second mechanical mesh, a steep-sloped curve for each of the odd harmonics, namely the first, third and fifth harmonics. This is shown by the line 53 made up of long dashes.

In the region of the forbidden second harmonic, the flexural resonance of the second mechanical mesh increases the relative sound pressure and decreases the motional impedance, thereby increasing the bandwidth of the transducer as shown by the line 52 and also illustrated by the box 42 in FIG. 3.

In the operation, the transducer 10 may receive acoustic energy from the seawater, or it may transmit acoustic energy to the seawater. Consider first that the receiver and signal generator circuit 11 applies an A.C. signal to the leads 13 and 12 and to the conductors 25 and 27 which are connected to the electrodes 24 and 26, respectively, as previously described. The column 16 of piezoelectric half-ring members 17, in response to the A.C. signal, will vibrate in a longitudinal mode about the fundamental or resonant frequency $f_r$ for those signals within that frequency region. As the frequency of the A.C. signal increases, the column 16 and the piston 15 will also vibrate in a flexural mode at or near the resonance of $2f_r$, thus increasing the bandwidth of the transducer 10. The radiating piston 15 moves essentially in a piston-like or reciprocating manner over the bandwidth between the first and second resonances, $f_r$ and $2f_r$. By maintaining the flexural resonance $2f_r$ outside the operating frequency band of the transducer 10, the flexural vibration is controlled and the side effects of the flexural vibration such as non-pistonlike motion are minimized.

The transducer 10 can also receive energy over a relatively broad frequency band in much the same manner as explained above for the radiation of acoustic energy. That is, the longitudinal and flexural mode of vibration of the piston 15 and the column 16 operate within the first and second resonant frequencies to increase the operating bandwidth of the transducer 10.

While there have been shown and described and pointed out the fundamental novel features of the invention as applied to a preferred embodiment, it will be understood that various omissions and substitutions and changes in the form and details of the transducer illustrated and in its operation may be made by those skilled in the art without departing from the spirit of the invention. Accordingly, the foregoing description should be taken as illustrative and not in any limiting sense.

What is claimed is:

1. A transducer comprising
   (a) a back member having a mass,
   (b) a piston,
   (c) a column of material exhibiting electromechanical transducing action,
   (d) said column of material being disposed between said piston and back member for vibration in a direction longitudinally of said column to define a first mechanical mesh having a resonant frequency $f_r$, and
   (e) means for biasing said column and piston for flexural vibration defining a second mechanical mesh closely coupled to said first mesh and having a resonant frequency of about $2f_r$.

2. A transducer comprising
   (a) a back member having a first mass,
   (b) a piston adapted to be connected to a load,
   (c) a column of material which vibrates longitudinally in response to an applied electric signal thereto,
   (d) said column being disposed between said back member and said piston along a first plane along a longitudinal axis of said column, said back member, piston and column being symmetrical about said first plane, and
   (e) said column and said piston being disposed along a second plane normal to said first plane and which passes through said longitudinal axis, one of said column and piston being unsymmetrical with respect to said second plane, whereby said column and said piston vibrate in a combined longitudinal mode and flexural mode at resonant frequencies, one of which is about twice the other.

3. The invention defined in claim 1 wherein said piston has a mass which is substantially less than the mass of said back member.

4. A transducer comprising
   (a) a back member,
   (b) a piston,
   (c) a stack of piezoelectric members interposed between said back member and said piston, and
   (d) biasing means coupling said back member to said piston to define an acoustic circuit having a first given resonant frequency and a second resonant frequency approximately two times said first resonant frequency.

5. A transducer comprising
   (a) a back member,
   (b) a piston,
   (c) a half-cylindrical stack which includes a plurality of half-ring piezoelectric members interposed between said back mass and said piston, and
   (d) biasing means coupling said back member to said piston to bias said half-cylindrical stack to define an acoustic circuit having a first given resonant frequency in a longitudinal mode of vibration and a second resonant frequency approximately two times said first resonant frequency in a flexural mode of vibration.

6. A transducer comprising
   (a) a back member having a first mass reactance,
   (b) a piston having a mass reactance less than said first mass reactance,
   (c) a column of material which vibrates in a longitudinal mode in response to an applied electrical signal,
   (d) said column being connected between said back member and said piston, and
   (e) said column having an arcuate cross-sectional area and being disposed symmetrically with respect to said piston about a diametral plane along a longitudinal axis through said column and unsymmetrically with respect to said piston about another longitudinal plane perpendicular to said diametral plane, whereby a flexural mode of vibration is induced in said column when said column is excited into said longitudinal mode of vibration.

7. The invention defined in claim 6 wherein said longitudinal mode of vibration has a first given resonant frequency and said flexural mode has a second resonant frequency which is approximately twice said first given resonant frequency.

8. A transducer comprising (a) a back member having a first mass,
(b) a piston for coupling vibrational energy from said transducer to a load, or vice versa,
(c) a column of material which vibrates in a longitudinal mode with a first given resonant frequency in response to an applied electrical signal, and
(d) said column being connected between said back member and said piston, so that said column and said piston vibrate in a flexural mode with a second given resonant frequency above said first frequency simultaneously with said longitudinal mode to derive a broadband of frequencies lying within said first and second resonant frequency.

No references cited.

CHESTER L. JUSTUS, *Primary Examiner.*

B. L. RIBANDO, *Assistant Examiner.*